Aug. 24, 1943.  F. G. BOVARD  2,327,863
CUTTING-OFF MACHINE
Filed July 24, 1942   3 Sheets-Sheet 1

Inventor
FLOYD G. BOVARD
By
Attorney

Aug. 24, 1943. F. G. BOVARD 2,327,863
CUTTING-OFF MACHINE
Filed July 24, 1942 3 Sheets-Sheet 2
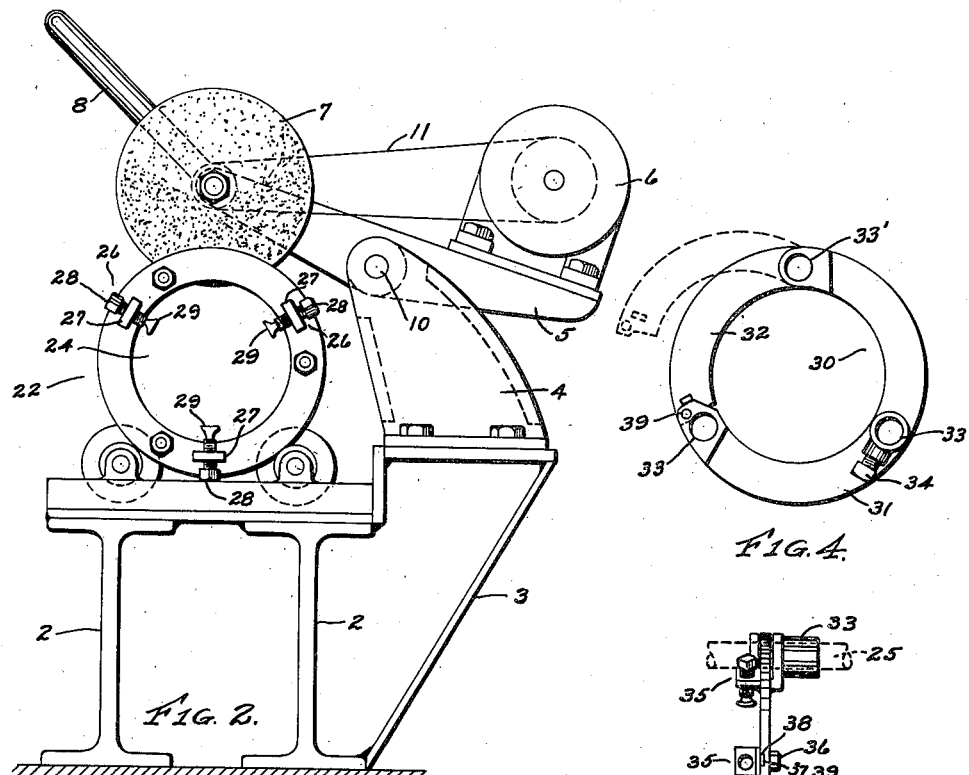
FIG. 2.
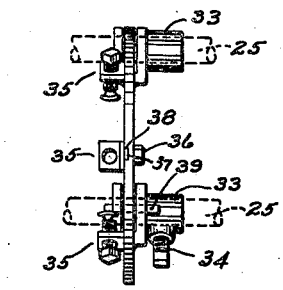
FIG. 4.
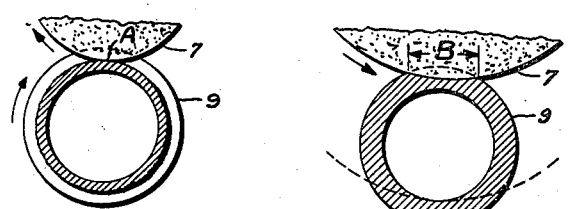
FIG. 7    FIG. 8.
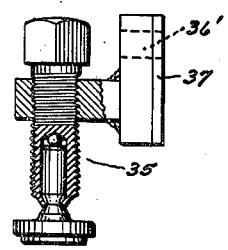
FIG. 5.
FIG. 6.
Inventor
FLOYD G. BOVARD
By
Attorney Aug. 24, 1943.  F. G. BOVARD  2,327,863
CUTTING-OFF MACHINE
Filed July 24, 1942  3 Sheets-Sheet 3

Inventor
FLOYD G. BOVARD
By
Attorney

Patented Aug. 24, 1943

2,327,863

UNITED STATES PATENT OFFICE 2,327,863

CUTTING-OFF MACHINE

Floyd G. Bovard, Akron, Ohio, assignor to The Ohio Brass Company, Mansfield, Ohio, a corporation of New Jersey Application July 24, 1942, Serial No. 452,242

17 Claims. (Cl. 51—105)

My invention relates to apparatus for and the method of cutting through various materials by use of an abrasive disk or wheel.

While my invention is applicable to cutting through various materials, it is particularly adapted to cutting vitreous materials such as rods and tubes of glass, porcelain, etc.

The accepted practice in the use of abrasive disks in cutting through various materials is to clamp the material securely to a stationary or fixed bed or support and to then manually or automatically feed the rotating abrasive disk or wheel through the work.

It is obvious that with the work stationary, the disk must cut entirely through the entire depth, thickness or diameter thereof, if it is a case of completely dividing the work or cutting off a portion thereof, as would be the case in trimming the end.

This requires a cutting disk having a diameter sufficient to cut through the work plus an amount sufficient to clamp the disk to its drive spindle. Assuming that a stationary bar of material 6" in diameter is being cut entirely through, and allowing 2" for wear and 8" for the clamping drive plates for the disk then the disk would be about (6"+2") x 2+8" or 24" in diameter. The large clamping plates to drive the disk are necessary and the power necessary to operate the disk through 6" of material is very great.

In cutting through large area sections, the cutting path builds up rapidly as the disk goes deeper into the work and soon the load is built up to a point where the feed must be reduced or more power must be applied to keep the disk at cutting speed. As the cutting disk is usually very thin, about 1/16 to 1/8 in thickness, this load must be kept below the breakdown point of the disk itself.

On some machines, as a means of reducing the cutting load the rotating cutting disk is oscillated back and forth, thus reducing the area of contact between the disk and the work. Still another machine mounts the disk and its drive mechanism on a transversely sliding bed whereby the rotating disk is fed back and forth across the work much the same as the tool on a shaper or planer.

Machines of this nature work quite well on work in which the depth of the cut will not require abnormally large diameter disks and the work is of such material that it is not affected adversely by the large amount of heat which is generated at the edge of the cutting disk.

When cutting metals, the material is a good conductor of heat and the common practice is to flood the work and wheel with water or some cooling fluid.

This latter method has been tried in the cutting of tubes and rods of vitreous materials, such as porcelain, but it has been found impossible to get any high rate of cutting on large area sections without serious spalling or cracking of the porcelain due to the heat insulating properties of the material and the difficulty of getting enough coolant into a narrow or deep cut to carry off the generated heat.

Other methods have been tried to sever porcelain rods and tubes, such as banding the work with a high resistance wire at the point of separation and then passing current through the wire to bring it up to a high temperature and then suddenly chilling the work, but the break in this case is unreliable and the end face is not smooth and even, and slightly grooving the work at the point of break and then rapping the work with a hammer has been tried, but the break in this case, also, is unreliable and likewise the end faces are rough and uneven.

In the use of my machine and method of cutting rods and tubes, especially of vitreous material, I rotate the work slowly while the swiftly rotating disk of abrasive material is pressed against the work at the point of severance.

This reduces the contact area between the work and the disk to an absolute minimum with a large portion of the heat carried away immediately by the blast of air created by the rotating disk and accumulation of heat being further prevented by contact point continually changing due to rotation of work. At the same time work of large diameter may be cut with a disk of comparatively small diameter, as it is only necessary to cut through one-half the diameter of a rod and only through the thickness of the wall in case of a tube. Suppose for instance, the work consists of a 6" diameter tube with a 1" thickness of wall then the diameter of the disk would not necessarily be greater than (1"+2") times 2+8" or 14", allowing 2" for wear and using 8" drive plates. Another advantage in cutting large diameter work is that as soon as the entire circumference of the tube or rod is scored through the surface thereof the disk is prevented from running off due to the cutting edge not being of uniform sharpness throughout its circumference.

The result of my method and machine is a saving in the cost of disks as well as the other advantages set forth above, as the cost of disk and the power required to drive increases rapidly as the diameter of the disk increases.

Reference to Figs. 7 and 8 will illustrate the difference in my new method of severing a tube in comparison with methods of the past.

Fig. 7 shows an end view of a partly severed tube 9 which has been broken, the shaded part represents the uncut portion of the tube. The unshaded portion shows the cut which has been made entirely around the tube by the disk 7 due to the rotation of the tube simultaneous with the cutting and it will be noted that the contact area between the disk and the tube is a very small extent, as at A.

Fig. 8 shows an end view of a tube of same size as in Fig. 7 partly severed and broken, the disk having cut into the tube to the same depth as in Fig. 7. The shaded portion shows the cut which has been made on one side of the tube, since the tube is non-rotatable and it will be noted that the contact area between the disk and tube is the entire length of the cutting contact between the disk and tube as shown at B times the width of the disk. It will be further noted that the area of contact increases until the disk has severed the wall of the tube at the top and that cutting must continue through the entire diameter of the tube to sever the same, and it will be further noted that when the disk (shown in dotted line) reaches the bottom portion of the tube wall that the cutting area is again very great.

A comparison of Figs. 7 and 8 will show why there is a large amount of power and time consumed and danger to the disk and work in connection with past methods of cutting, let us say porcelain tubes and rods as compared with my new method.

The principal object of my machine and method for cutting tubes and rods or bars is to rotate and provide means to rotate the work as the rotating cutting disk of abrasive material is applied to the work, whereby the depth of cut necessary to separate the work into parts is reduced to a minimum as well as the time of perfecting the operation.

Another object is to provide means for quickly loading and unloading the work with respect to the work fixture and centering the same therein.

Another object is to produce a cut having a smooth, even and straight surface at 90° to axis of work.

Other objects will be apparent to those skilled in the art as I proceed with a description of my inventions.

My inventions reside in the new and novel construction, combination and relation of the parts show in the drawings and described in the specification and the steps of operation set forth therein.

In the drawings:

Fig. 2 is a view of the right hand end of Fig. 1 in elevation, omitting, however, the drive mechanism in order to avoid confusing the end construction of the carriage and rollers of Fig. 1, as the drive mechanism is shown clearly in Figs. 1 and 3.

Fig. 4 is a face view of one of the work holders which I use.

Fig. 5 is an edge view of the holder shown in Figs. 1 and 4.

Fig. 6 is a detail of the clamp used to secure the work in place.

Fig. 7 shows the relation between the work and cutting disk under my method of operation.

Fig. 8 shows the relation between the work and cutting disk under old methods of operation.

Figure 1:
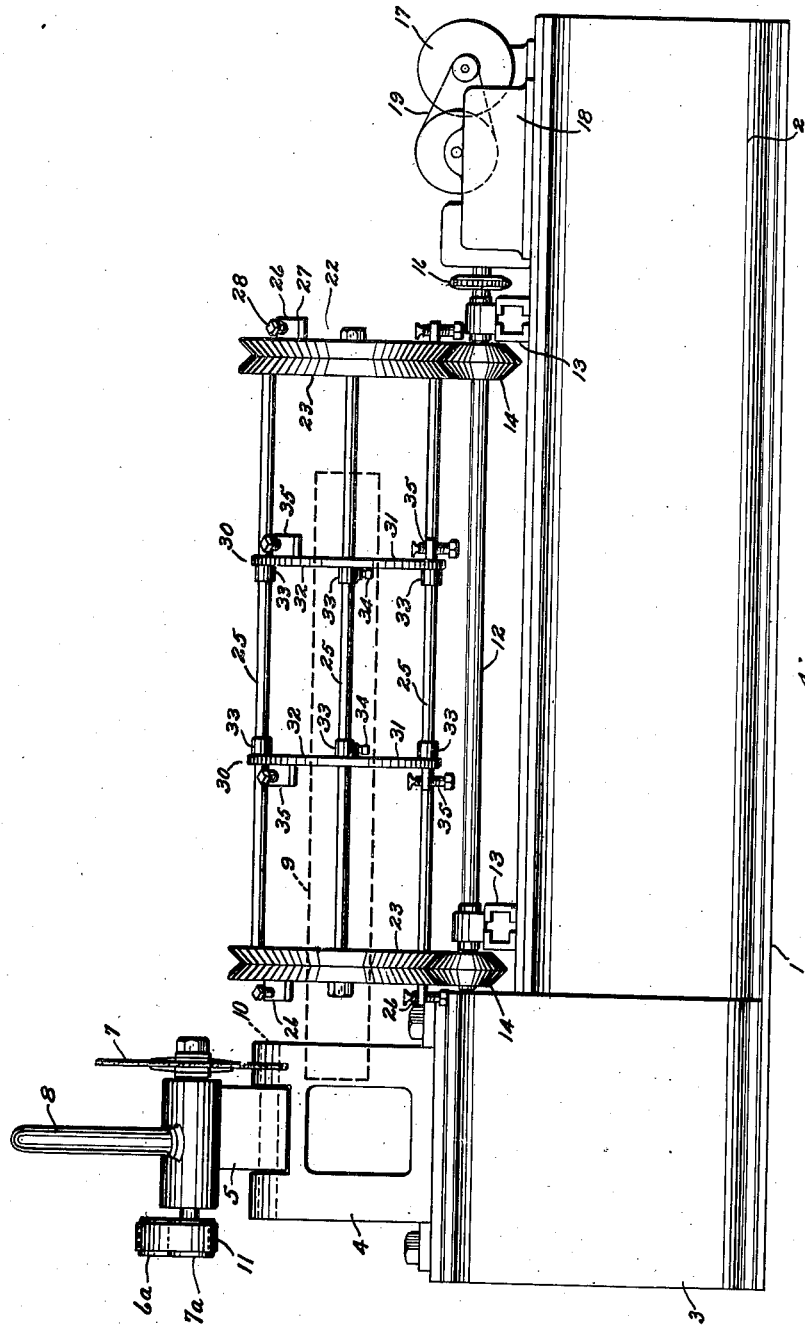
Fig. 1 is a front elevational view of a machine embodying my invention.
Figure 3:
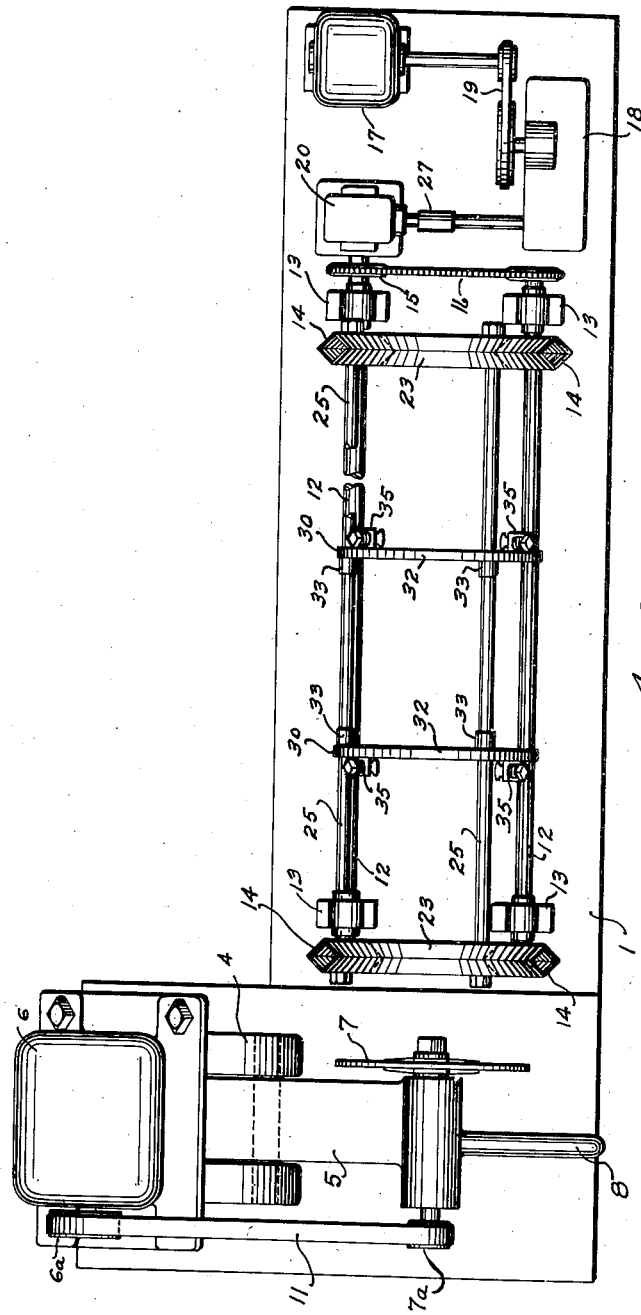
Fig. 3 is a top plan view of my improved machine.

All the parts which enter into the construction of my machine are not shown in detail for the reason that I claim no invention for such details and, therefore, have indicated such parts schematically as for instance the drive mechanism for the work carrier.

In the praferred embodiment of my machine, I provide a base 1 which has the portion 2 for the rotatable carrier and the portion 3 for the cutting disk and its operating mechanism. The base may be constructed in any suitable manner to meet requirements. I have shown it as built up of I-beams and plates which may be secured together and the parts 2 and 3 united to provide a unit structure.

Mounted on the base portion 3 is the cutting head and drive mechanism therefor. Pivotally mounted on a support 4 is a frame 5 provided with a motor 6 and pulley 6a at one end and a cut-off disk 7 and pulley 7a at the other end.

The parts 5, 6 and 7 are so located relative to the pivotal point of the frame 5 and with respect to their weights that the combination is slightly overbalanced on the motor end of the frame, so that normally the motor 5 will be down and the disk 7 raised above its cutting position.

A handle 8 is used by the operator to move the cutting disk 7 into engagement with the work 9 (shown in dotted line) above the axle 10. A belt 11 transmits power to the disk from the motor. Very little effort is required by the operator in moving the combination 5, 6 and 7 to its cutting position.

Mounted on the base portion 2 is the rotating work carrier. A pair of parallel drive shafts 12 are mounted in bearings 13 and each shaft is provided at each end with a roller 14. I have shown the rollers as having external wedge drive faces but which may have internal wedge drive faces forming a V-groove drive. At one end of each shaft 12 or at both ends, if desired, is a drive sprocket 15 and chain 16 therefor. This drive may also be made by means of a train of gears or by a belt, but I prefer the more positive means of a chain as shown or gearing.

A separate drive unit for rotating the carrier and its support is employed which may be of any suitable construction and arranged for that purpose. The parts making up the drive may be standards procurable from manufacturers thereof.

I have shown a carrier drive schematically, comprising a motor 17 which drives an adjustable speed changing mechanism 18 by means of a belt 19. Connected to the speed changing mechanism 18 is a worm gear mechanism 20 by means of which it may be said the axis of the rotating shaft 21 is changed from right angles to the axis of the shaft 12 into alignment therewith. The gear mechanism 20 is shown as directly connected to one of the shafts 12 to drive the same.

The gear mechanism 20 may be arranged to act as a speed reducer to further reduce the speed of rotation of the shaft 12 from that of the speed changing mechanism 18. If desired the operating mechanism for the rollers may be placed on a lower level than that shown in Fig. 1 but I prefer the mechanism so placed that a direct connection may be made between the part 20 and the shaft 12.

The revolving work carrier or cage 22 is mounted upon the rollers 14. This carrier comprises a pair of circular end members 23 having peripheral V-grooves to operate with the periphery of the rollers 14 and arranged to be rotated thereby through friction therewith. Each end member has an opening 24. The members are held in spaced, upright and parallel relation by the parallel rods 25 spaced equal distances apart.

I mount upon one end face of each end member 23, preferably the outer face, clamping means 26 to hold the work 9 and maintain it axially center with the carrier 22 and cause the work to rotate with the carrier. The carrier may be made of any length desired to accommodate the longest rods or tubes to be operated upon.

The work holding clamping means 26 consists of lugs 27 attached to the end members by bolting or welding, and screws 28 are provided with a swivel end 29, similar to the clamp shown in Fig. 6.

When it is desired to operate on tubes or rods which are shorter than the carrier or to support the work intermediate their ends as well as at the ends, I mount on the rods 25, one or two work holders 30 (shown in more detail in Fig. 4) which comprises a ring formed of two segments 31 and 32. In the drawings I have shown two work holders 30. The holders may be duplicates or may be rights and lefts as shown.

Each ring has bosses 33 and 33', one for each rod 25, secured to one face of the segments and equally spaced apart and each boss is provided with a through opening to receive a rod 25 upon which the holder is longitudinally adjustable for different lengths of work. One boss 33 is provided with a set screw 34 to grip the rod 25 to prevent longitudinal movement of the holder after adjustment.

The segment 32 of the work holder 30 is hinged at one end to the segment 31 and one rod 25 passing through the boss 33' and the segments act as the hinge pin. This construction permits the operator to open the holder and place the work therein laterally in place of endwise as through the opening 24.

Each holder is provided with clamping means 35 spaced around the holder ring and secured thereto by cap screws 36 in the threaded opening 36'. The design of the clamping means is shown in Fig. 6 and has a flange 37 which fits in a radial guide groove 38 in the segments. This construction of the clamping means 35 permits the use of clamping means of different lengths for different sizes of work thus avoiding the use of extra long screws which if made long enough to grip a small diameter of work would be too long for a work of large diameter and vice versa.

When the holder is closed with work therein, a pin 39 is applied which engages the segment 31 and the free end of the segment 32 thus maintaining the holder closed and when the screw of the clamping means on segment 32 is engaging the work, the pin 39 is held from displacement by the pressure thereon due to the segment 32 tending to open, since one of the clamps 35 is attached thereto.

When using the holder 30 for the work, the two clamping means 35 on the segment 31 are adjusted to axially align the work with the axis of the carrier and after that it is only necessary to operate the clamp on the segment 32 in order to hold the work central. Whenever possible, I prefer to use the holders 30 for the work as they are more convenient to use since it is a very simple time saving operation to open and close the holder 30 and there is less danger of breaking the work if of vitreous material than by attempting to pass the work endwise through the opening 24 and the holders 30. The clamp on the segment 32 must first be loosened slightly before the pin 39 can be removed.

I prefer to use three work clamping means on each end member 23 and on each holder 30 which I find are sufficient to hold and drive the work and much quicker in operation than if more clamps were used.

Having adjusted the clamps on the holders for the work, as shown in dotted lines in Fig. 1, the segments 32 are thrown open and the work inserted sideways. The segments 32 are then closed and the pin 39 inserted and the clamping screws on the segment 32 are brought securely into engagement with the work.

The drive mechanisms for the work carrier and for the abrasive disk are then set in motion and the operator then pivots the disk about the axle 10 and moves it into contact with the rotating work. If the work is out of round as is usually the case with porcelain tubes or rods, the operator applies the disk to the rotating surface of the tube or rod with relatively light pressure until a continuous cut has been established on the surface of the work and then the operator applies considerably more pressure of the disk upon the work, as taught from experience, until the necessary cut is made.

I claim:

1. A machine for the purpose described comprising, a base, a cutting unit mounted on the base and comprising a disc of abrasive material and a motor to rotate the disc, means to hold the work adjacent to the disc and continuously rotate the work in one direction and rotatable means supported by the base to support and to rotate the work supporting means at a relative slow speed, compared to that of the disc, the axes of rotation of the said means being parallel and spaced apart and means to move the disc into engagement with the rotating work.

2. A machine for the purpose described comprising a base, a cutting unit mounted on the base and provided with a rotating disc of abrasive material and means to pivot the unit in the plane of the disc, a rotating work holding unit to hold and rotate the work, rotating means mounted on the base and provided with means upon which the work-holding unit is supported and rotated and held against longitudinal movement, the work held transverse of the plane of the disc and rotatable on an axis parallel to the axis of the disc whereby the rotating disc may be brought into engagement with the rotating work when the cutting unit is pivoted, the longitudinal axis of rotation of the work holding unit and the longitudinal axis of rotation of the said rotating means being parallel and transversely spaced.

3. A machine for cutting rods and tubes comprising a base, a cutting unit pivotally mounted on the base, a cutting disc positioned to one side of the pivotal mounting, driving means mounted on the other side of the pivotal mounting and arranged to rotate the disc, a work holding unit comprising an elongated rotatable cage-like device provided with means to support the work within the device and axially thereof, at least one end of the device being open to permit the work to project therefrom and into the path of the disc, rotatable means provided with means to cooperate with and to support and rotate the work-holding unit, the work holding unit and the rotatable means being so constructed and arranged as to support the work holding unit by gravity whereby the loaded work holding unit is removable and replaceable relative to the rotatable means and the workholding unit is held against longitudinal movement relative to the rotatable means and means associated with the cutting unit whereby the unit may be pivoted and the rotating disc brought into engagement with the work.

4. A work holding unit for a machine for the purpose described comprising a fixed base, a base mounted on the fixed base and provided with rotating means, an elongated cage-like device provided with end members and at least one member having an open end, the end members of the cage and of the rotating means on the base having cooperating obliquely shaped faces whereby the cage-like device is held in predetermined position relative to the fixed base and is rotated through friction between said cooperating faces, means associated with the end members adjustable to engage with and hold the work in fixed position within the device and to rotate the work with the device and means to actuate the rotatable means on the base.

5. A work holding unit for a machine for the purpose described comprising a fixed base, a super base mounted on the fixed base, and comprising a pair of spaced and parallel shafts, a cage-like device provided with end members, means secured to the shafts to cooperate with the end members to support and rotate the device and means to rotate the shafts, means forming a part of the cage-like device to receive and hold the work in longitudinal and axial relation to the device and effect its rotation and means whereby the last said means may be adjusted to different sizes of work.

6. A work holding unit for use with a machine for the purpose described comprising, a fixed base rotatable means mounted on the fixed base, a cage-like device mounted on the rotatable means, means to rotate the rotatable means, means on the rotatable means to cooperate with means on the cage-like device whereby the device is held against longitudinal movement and is rotated about its longitudinal axis when the said rotatable means is rotated, means associated with the device to receive and hold the work with the work projecting from one end of the cage-like device into the path of a cutting disc, the last said means being adjustable with respect to the work.

7. A work holding unit for use with a machine for the purpose described comprising, a super base arranged to be mounted on a fixed base, an elongated cage-like device mounted on the super base, the said device comprising, a pair of open and spaced end members, rods extending between the end members to hold them in spaced and parallel relation, means on the super base to cooperate with the said end members whereby the cage-like device is supported and rotated when the said means on the super base rotates, means to rotate the means on the super base, supporting means mounted on the rods and longitudinally adjustable relative to the end members and also radially adjustable, to receive the work and effect its rotation with the rotation of the device, the said supporting means provided with one hinged section whereby the supporting means may be opened on one side to receive the work laterally in place of endwise and means to hold the hinged section in closed position.

8. A work holding unit for use with a machine for the purpose described comprising, a super base arranged to be mounted on a fixed base, an elongated cage-like device mounted on the super base, the said device comprising, a pair of open and spaced end members, rods extending between the end members to hold them in spaced and parallel relation, means on the super base to cooperate with the said end members whereby the cage-like device is supported and rotated when the means on the super base rotates, means to rotate the said means on the super base, supporting means mounted on the rods and longitudinally adjustable relative to the end members and also radially adjustable, to receive the work and effect its rotation with the rotation of the device, the said supporting means provided with one hinged section whereby the supporting means may be opened on one side to receive the work laterally in place of endwise and means to hold the hinged section in closed position and radially adjustable means on the end members to engage the work and effect rotation of the work, either radially adjustable means may be used to hold and rotate the work or both radially adjustable means may be employed.

9. A machine for the purpose described comprising a base, an elongated cage-like device supported by the base, the said device comprising a pair of end members one member at least being open to permit the work to project through, radially adjustable means on each end member to grip and hold the work axially central within the cage-like device, a plurality of rods connecting the end members and holding them in spaced and parallel relation, supporting means adjustably mounted on the rods intermediate the end members to be moved longitudinally of the rods, the supporting means provided with at least two sections, one section hinged on one of the rods whereby the supporting means may be opened to load and unload the cage-like device sidewise in place of endwise, means to hold the hinged section closed, radially operable means on each supporting means to grip and hold the work, rotatable means interposed between the cage-like device and the base and supported by the base to support the cage-like device and to rotate the same and the work, means to operate the rotatable means, cutting means mounted on the base and provided with a cutting disc of abrasive material normally out of engagement with the work but movable into engagement with the work, means to rotate the disc and means to move the disc into cutting engagement with the work.

10. A machine for the purpose described, comprising a base, an elongated cage-like device supported by the base, the said device comprising a pair of end members one member at least being open to permit the work to project through, radially adjustable means on each end member to grip and hold the work axially central within the cage-like device, a plurality of rods connecting the end members and holding them in spaced and parallel relation, supporting means adjustably mounted on the rods intermediate the end members to be moved longitudinally of the rods, the supporting means provided with at least two sections, one section hinged on one of the rods whereby the supporting means may be opened to load and unload the cage-like device sidewise in place of endwise, means to hold the hinged section closed, radially operable means on each section of the supporting means to grip and hold the work axially central of the cage-like device and so arranged that only the radially operable means on the hinged section requires operation to clamp and unclamp the work in loading and unloading the device, rotatable means interposed between the cage-like device and the base and supported by the base to support the cage-like device and to rotate the same and the work, means to operate the rotatable means, cutting means mounted on the base and provided with a cutting disc of abrasive material normally out of engagement with the work but movable into engagement with the work, means to rotate the disc and means to move the disc into cutting engagement with the work.

11. A machine for the purpose described comprising a base, an elongated work holding cage-like device supported by a super base interposed between the device and base and mounted on the base, means to rotate the cage-like device, end members on the device, a plurality of rods supporting the end members in parallel and spaced relation, longitudinally adjustable supporting means mounted on the rods, radially adjustable means on each supporting means to grip and hold the work and a rotatable abrasive disc mounted on the base and arranged to engage the work to cut the same.

12. A machine for the purpose described comprising a base, an elongated work holding cage-like device, a pair of spaced and parallel rods each having a plurality of enlargements fixedly secured thereto and upon which the work holding device is mounted, means to rotate the rods and enlargements which in turn rotate the work holding device, means associated with the work holding device to grip and hold the work substantially central with the axis of revolution of the work holding device with a portion of the work projecting from an end of the holding device and effects rotation of the work, and means mounted on the base for cutting into the work, the said means comprising a pivotally mounted disc of abrasive material and means for rotating the same, the disc mounted to rotate in a plane at right angles to the axis of the work which projects into the path of the disc and means to move the disc into engagement with the work.

13. In a machine for the purpose described, a portion for holding the work thereto comprising a ring-like member open in the center to receive the work, a plurality of elongated parallel supporting means, receiving means on the ring-like member for slidably mounting the ring-like member on the supporting means, the said member comprising a pair of segments, one segment having associated therewith all of the receiving means and the other segment being hinged to the first segment and one of the supporting means acting as the hinged pin, means on one of the receiving means to engage the supporting means thereof to secure the ring-like member against longitudinal displacement, means to lock the hinged segment in its closed position and radially adjustable means associated with the member to engage and hold the work axially central with the member, one of the radially adjustable means being associated with the hinged segment.

14. In a machine for the purpose described, a portion for holding the work thereto comprising a ring-like member open in the center to receive the work, a plurality of elongated parallel supporting means, receiving means on the ring-like member for slidably mounting the ring-like member on the supporting means, the said member comprising a pair of segments, one segment having associated therewith all of the receiving means and the other segment being hinged to the first segment and one of the supporting means acting on the hinged pin, means on one of the receiving means to engage the supporting means thereof to secure the ring-like member against longitudinal displacement, means to lock the hinged segment in its closed position and radially adjustable means associated with the member to engage and hold the work axially central with the member, each radially adjustable means including a replaceable bracket secured to the face of the ring-like member whereby radially adjustable means of different lengths may be used depending upon the diameter of the work, thereby reducing to a minimum the amount of adjustment necessary to grip and release the work.

15. A machine for the purpose described, a rotating cake-like member open through the center to receive the work, said cage-like member consisting of end rings to engage driving means, a plurality of elongated parallel bars connecting the end rings, one or more auxiliary rings comprising a pair of segments slidably mounted on the parallel bars, one segment being hinged relative to the other segment whereby it may be opened and closed to receive or remove work mounted within the cage-like member, adjustable clamping means associated with said segments to hold the work, locking means between the segments to prevent the hinged section from opening during the rotation of the cage-like member, locking means for securing the auxiliary rings to at least one of the said elongated parallel bars whereby longitudinal movement of the auxiliary rings is prevented during the rotation of the cage-like member, the said member being mounted on driving means such that it may be lifted from said driving means and replaced by a similar member of greater or less diameter, said driving means comprising a cradle with driving surfaces coacting with meshing surfaces on the said end rings whereby the cage-like member is positioned in proper relation axially and longitudinally relative to the driving means and a cutting disc, the weight of said member either with or without work therein being sufficient to hold the cage in engagement with the driving means and with enough pressure to insure rotation of the member and to prevent displacement of the member while the machine is in operation.

16. A work supporting unit for use with a machine for the purpose described comprising, an elongated cage-like device provided with a pair of open and spaced end members, a plurality of rods supporting the end members in parallel and spaced relationship, longitudinal adjustable work support means mounted on the rods, radially adjustable means on each supporting means to grip and hold the work, circumferential means on the cage-like device adapted to engage with and to support the device on rotating means whereby the device and work are rotated and the device and work held against longitudinal movement relative to the rotating means.

17. In a machine of the class described, and in combination, a base, a cutting unit pivotally mounted on the base, the unit comprising a cutting disc and means to rotate the same, means to pivot the unit in the plane of the disc, a rotatable work holder having a longitudinal axis of revolution extending at right angles to the plane of the disc, means associated with the work holder to hold the work in the path of the disc to be engaged thereby when cutting unit is pivoted upon its pivotal axis, rotatable drive means to rotate the work holder, means on the drive means cooperating with means on the work holder whereby the work holder is supported upon and rotated by the drive means, the drive means and the work holder being so constructed, arranged and positioned relative to each other that the loaded work holder will be held in position upon the rotatable drive means by gravity and may be removed and replaced without disturbing the work or any of the other parts of the machine and whereby relative longitudinal movement of the work holder and the drive means will be prevented.

FLOYD G. BOVARD.